(12) United States Patent
Phan et al.

(10) Patent No.: US 11,015,638 B2
(45) Date of Patent: May 25, 2021

(54) CAPTIVE SCREW AND METHOD FOR INSTALLING SAME

(71) Applicant: FASTENER TECHNOLOGY CORPORATION, North Hollywood, CA (US)

(72) Inventors: Benjamin Phan, Arcadia, CA (US); Simon Ly, Rosemead, CA (US); William Smyrski, Granada Hills, CA (US); An Tran, Rosemead, CA (US); Patrick Tran, Arcadia, CA (US); Yuriy Bern, No. Hollywood, CA (US); Larisa Zilber, Northridge, CA (US); Jeffrey Hang, Rosemead, CA (US); Dennis Suedkamp, Porter Ranch, CA (US)

(73) Assignee: FASTENER TECHNOLOGY CORPORATION, North Hollywood, CA (US)

( * ) Notice: Subject to any disclaimer, the term of this patent is extended or adjusted under 35 U.S.C. 154(b) by 112 days.

(21) Appl. No.: 16/668,426

(22) Filed: Oct. 30, 2019

(65) Prior Publication Data
US 2020/0158160 A1 May 21, 2020

Related U.S. Application Data

(60) Provisional application No. 62/768,332, filed on Nov. 16, 2018.

(51) Int. Cl.
*E01B 9/12* (2006.01)
*F16B 41/00* (2006.01)
(Continued)

(52) U.S. Cl.
CPC .......... *F16B 41/002* (2013.01); *F16B 35/041* (2013.01); *F16B 39/028* (2013.01)

(58) Field of Classification Search
USPC .......................................... 411/337, 348, 353
See application file for complete search history.

(56) References Cited

U.S. PATENT DOCUMENTS

| 4,530,618 A | * | 7/1985 | Stoll | F16B 21/078 24/642 |
| 4,655,657 A | * | 4/1987 | Duran | F16B 21/10 411/21 |

(Continued)

*Primary Examiner* — Gary W Estremsky
(74) *Attorney, Agent, or Firm* — Fulwider Patton LLP

(57) ABSTRACT

A captive fastener and method of use is disclosed wherein the screw is comprised of a head and shank, and where the shank includes a radial counter bore that retains a spring biased pin. The spring may bear against a plug in the counter bore or the shank inner wall, and biases the pin outward such that it extends outside of the shank in the absence of a compressive force. The captive screw is inserted through a top panel by tilting the screw at the opening of the panel such that the pin is pushed inward into the channel formed by the counter bore (against the force of the spring). Once the pin is recessed in the screw, the screw is passed through the panel opening until the shank emerges on the other side. Once the shank pushes through the panel, the pin will emerge under the biasing of the spring to extend outward of the shank in the radial direction. The pin thus prevents the screw from disengaging with the panel. A holdout fork is applied to the shank to anchor the screw at the retracted position, which keeps the screw up right against the surface of the panel.

2 Claims, 4 Drawing Sheets

(51) Int. Cl.
 *F16B 35/04* (2006.01)
 *F16B 39/02* (2006.01)

(56) References Cited

U.S. PATENT DOCUMENTS

| | | | | |
|---|---|---|---|---|
| 4,759,671 | A * | 7/1988 | Duran | F16B 21/086 411/347 |
| 4,988,248 | A * | 1/1991 | Flux | F16B 21/16 280/507 |
| 5,056,208 | A * | 10/1991 | Stafford | F16B 21/186 29/515 |
| 5,160,165 | A * | 11/1992 | Hoblingre | B62D 1/184 280/775 |
| 5,193,956 | A * | 3/1993 | Duran | F16B 13/068 411/33 |
| 5,199,152 | A * | 4/1993 | Wagner | F16B 41/002 29/444 |
| 5,224,806 | A * | 7/1993 | Duran | F16B 2/04 411/33 |
| 5,890,861 | A * | 4/1999 | Kaiser | F16B 41/002 411/426 |
| 5,931,621 | A * | 8/1999 | Griffith | F16B 39/02 411/255 |
| 9,297,401 | B2 * | 3/2016 | Langlais | F16B 21/165 |
| 9,447,815 | B2 * | 9/2016 | Roberts | F41C 33/006 |

\* cited by examiner

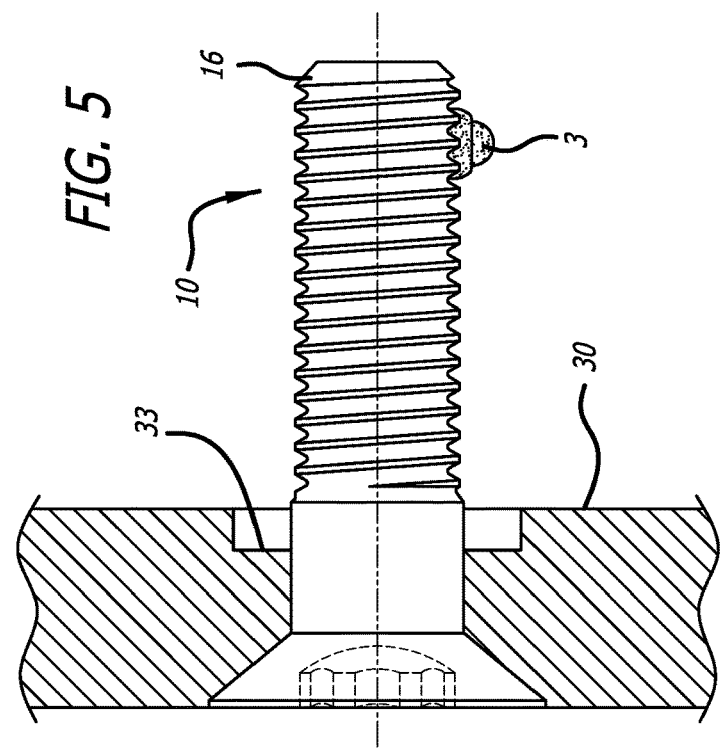
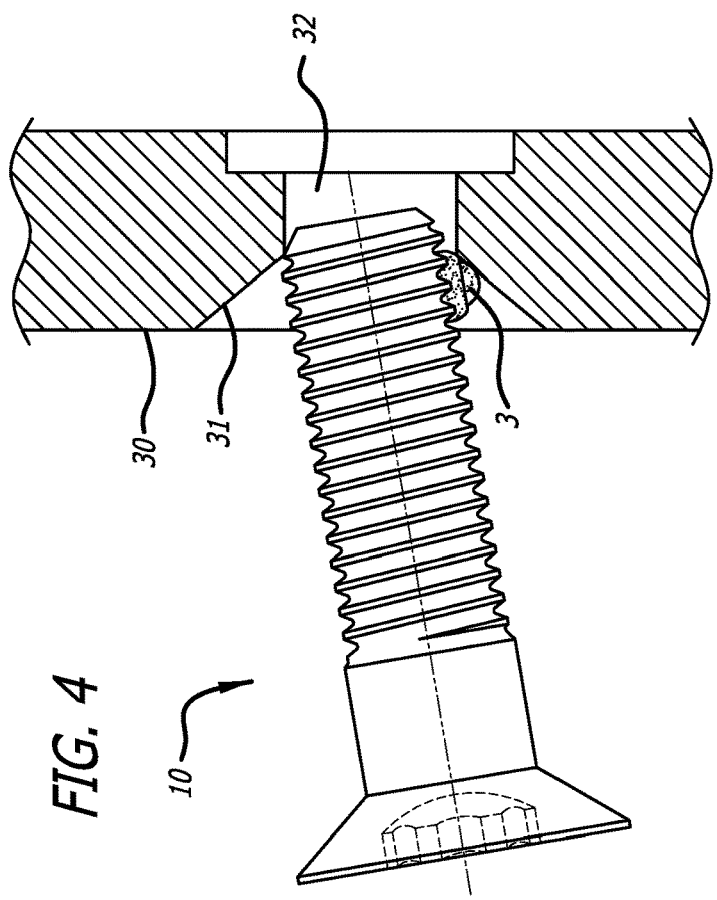

CAPTIVE SCREW AND METHOD FOR INSTALLING SAME

CROSS-REFERENCES TO RELATED APPLICATIONS

This application claims priority from U.S. Application No. 62/768,332 filed Nov. 16, 2018, the content of which is fully incorporated herein by reference.

BACKGROUND

Captive screws are used for many applications, including panels and walls where it is difficult to secure the opposite side of the screw assembly. Captive screw assemblies are typically comprised of a captive screw, along with flat washer &/or lock washer or retainer. Threads on captive screws are relieved under the head for a portion of the length, so that once threaded through a panel with a washer on the other side, the screw will not fall out. Captive screws are most often used to secure panels because if loosened it will remain in the panel. When provided with lock washers and captive washers, they provide a wider fastening surface to the panel, while inhibiting the screw from loosening. Also, if provided with a retainer, the assembly may be held into the panel by pressing or swaging the retainer, and the screw is prevented from falling out by the retainer

SUMMARY OF THE INVENTION

The present invention pertains to a novel captive screw and method of use. The screw is comprised of a head and shank, where the shank includes a radial counter bore that retains a spring biased pin. The spring may bear against a plug in the counter bore or the shank inner wall, and biases the pin outward such that it extends outside of the shank in the absence of a compressive force. The captive screw is inserted through a top panel by tilting the screw at the opening of the panel such that the pin is pushed inward into the channel formed by the counter bore (against the force of the spring). Once the pin is recessed in the screw, the screw is passed through the panel opening until the shank emerges on the other side. Once the shank pushes through the panel, the pin will emerge under the biasing of the spring to extend outward of the shank in the radial direction. The pin thus prevents the screw from disengaging with the panel. A holdout fork is applied to the shank to anchor the screw at the retracted position, which keeps the screw up right against the surface of the panel.

These, and other features of the invention will best be understood with reference to the drawings and the detailed description of the invention below.

BRIEF DESCRIPTION OF THE DRAWINGS

FIG. 4 is a side view of the fastener of FIG. 1 entering a panel;

FIG. 5 is a side view of the fastener of FIG. 1 having passed through the panel;

DETAILED DESCRIPTION OF THE PREFERRED EMBODIMENTS

Figure 1:
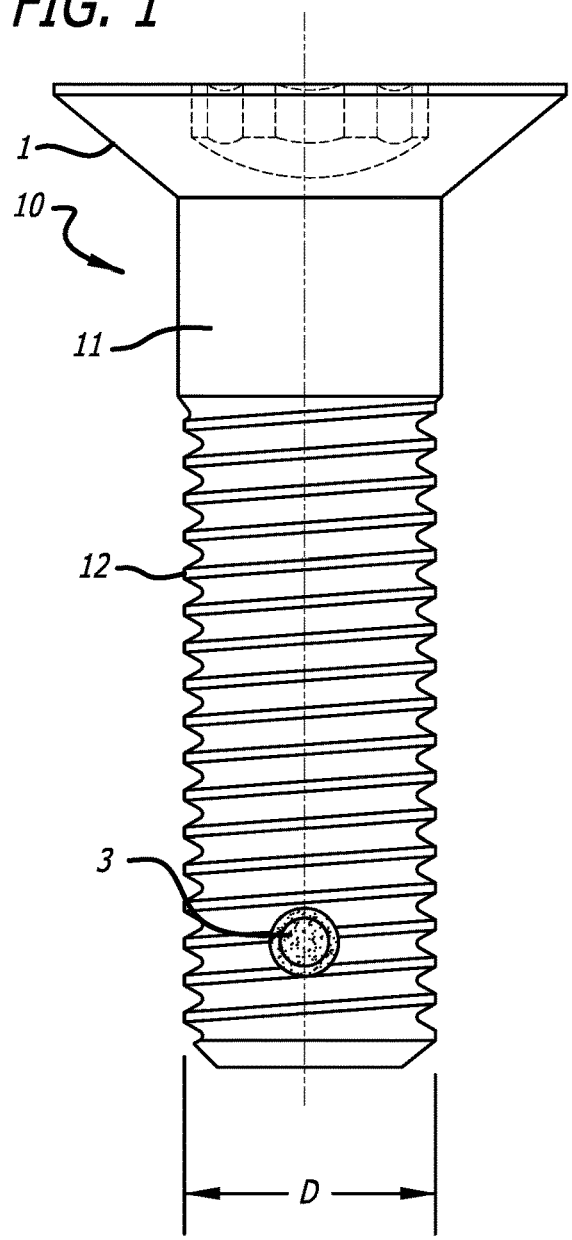
FIG. 1 is a front view of the screw of the present invention.
Figure 2:
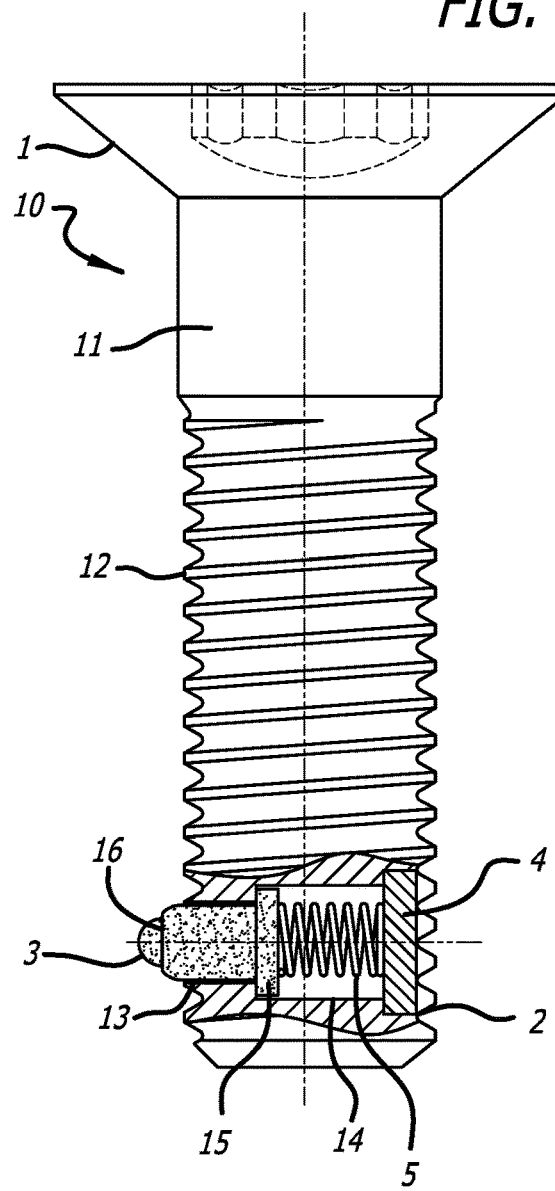
FIG. 2 is a side view, partially cut away, of the screw of FIG. 1.
Figure 3:
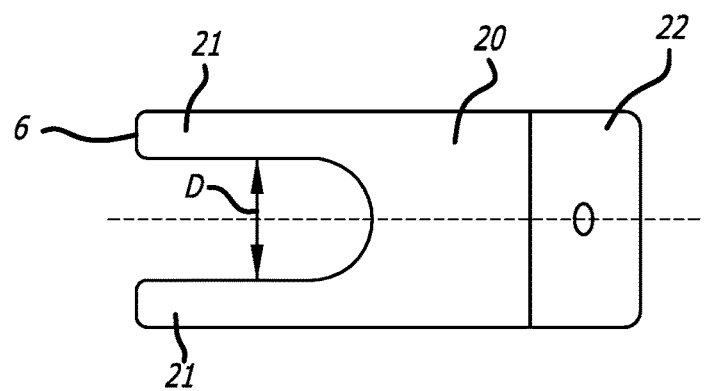
FIG. 3 is a plan view of a holdout fork of the present invention.

The present invention is both an apparatus and a method for installing a captive screw in a panel. FIGS. 1-3 illustrate the fastener 10 having a head 1, a neck 11, and a threaded shank 12. At the base of the shank 12 is a first bore 13, a second counter bore 14, and a third counter bore 2 extending traversely (radially). Counter bore 2 is closed with a plug 4, and counter bore 14 retains a coil spring 5 aligned with the axes of the counter bores. Within the first bore 13 is a pin 3 having a head 15 sized to prevent the pin from escaping the second counter bore 14. The pin 3 slides transversely in the bore 13 against the biasing of the spring 5, such that a distal tip 16 of the pin 3 can recede into the bore 13, or project outside of the shank 12 as shown in FIG. 2. An inwardly directed force on the pin 3 will compress the spring 5 and allow the pin to recede into the screw 10, and if the inwardly directed force is removed the spring 5 will push the pin 3 until the distal tip 16 is extended outside of the threaded shank 12. FIG. 3 illustrates a holdout fork 6, comprising a base 20 and two tines 21 spaced apart by a distance equal to the diameter D of the shank 12. In a preferred embodiment, the base 20 includes an angled tab 22 that extends obliquely at between one hundred thirty degrees and one hundred forty degrees from the base 20 to provide a thumb/finger grip.

Figure 6:
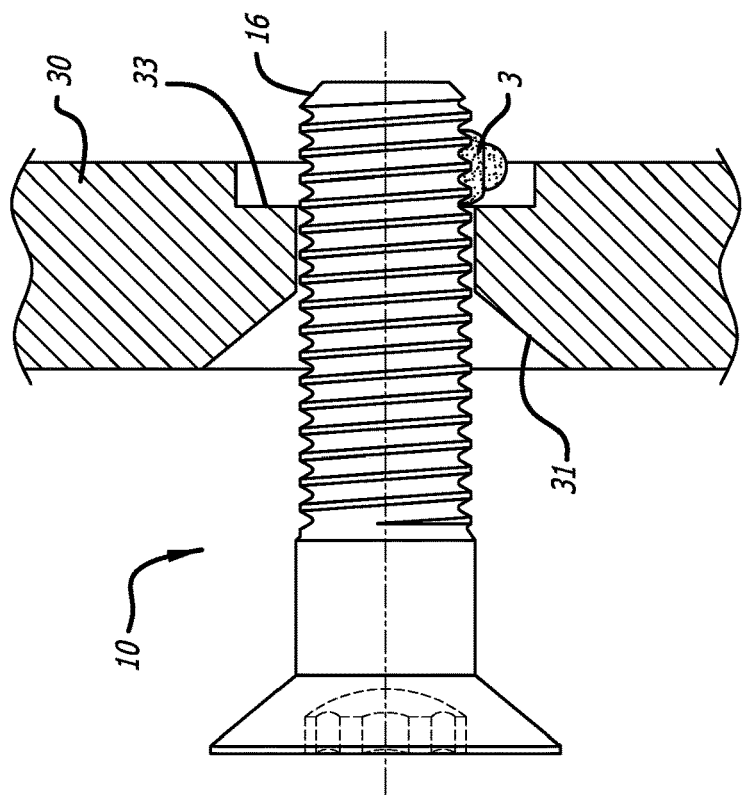
FIG. 6 illustrates the locking feature of the pin preventing retraction of the screw.

FIGS. 4-8 illustrate the installation method of the present invention. In FIG. 4, the screw 10 is placed in contact with a panel 30 at a beveled opening 31 of an aperture 32 in the panel 30. The screw 10 is placed in contact with the panel 30 such that the pin 3 is depressed into the bore of the screw, allowing the screw 10 to enter the aperture 32 without interference from the pin 3. As the screw completes the journey through the panel 30, the distal tip emerges from the aperture 32 and the pin 3 extends outward from the shank 12 under the bias of the spring 5, as shown in FIG. 5. Here, the screw is flush with the panel 30 at the screw head 1, which coincides with and bears against the beveled opening 31. The opposite side of the panel 30 includes an annular recessed cut-out 33 with a radius that is large enough to accommodate the fully extended pin 3 (FIG. 6). FIG. 6 further illustrates the locking aspect of the pin 3, as the screw 10 cannot retreat fully from the aperture 32 by virtue of the interference by the pin 3 with the panel wall at the cut-out 33.

Figure 7:
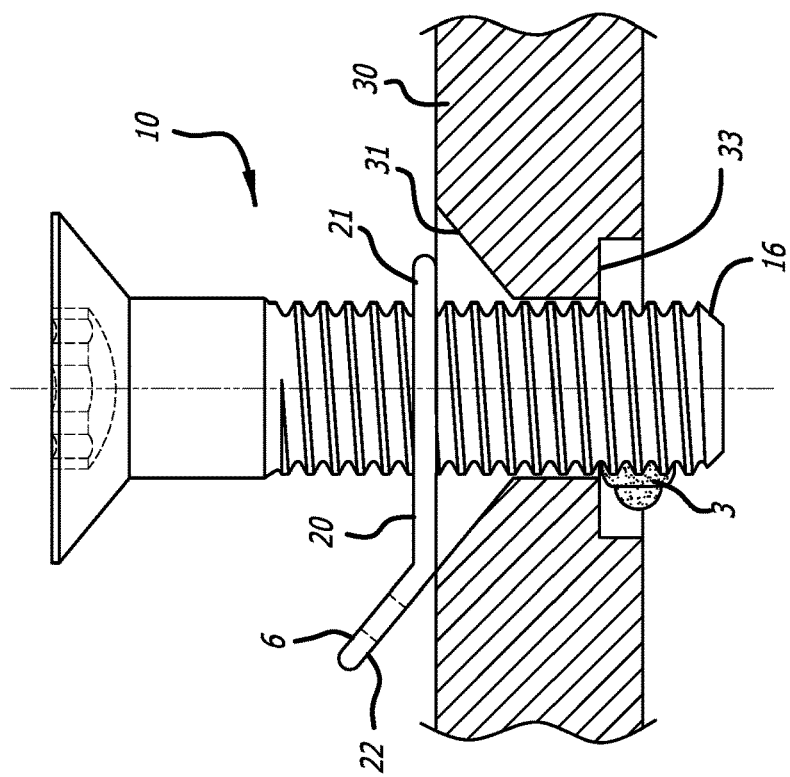
FIG. 7 illustrates the holdout fork engaged with the screw.

FIG. 7 illustrates the function of the hold-out fork 6. Tab 22 is angled away from the surface of the panel 30 and provides a suitable grasp point for holding the holdout fork 6 between a thumb and forefinger. The hold-out fork 6 is placed on the shank 12 of the fastener 10 such that the tines 21 engage the shank 12 therebetween in a rigid manner to hold the fastener 10 perpendicular to the panel 30 and ensures that the pin 3 is pressed against the cut-off 33 or panel 30 so that the screw 10 is maintained at the retracted position as shown on FIG. 7. When the captive screw is ready to be engaged with the mating component the hold-out fork 6 is removed. The hold-out fork 6 can be reused.

Figure 8:
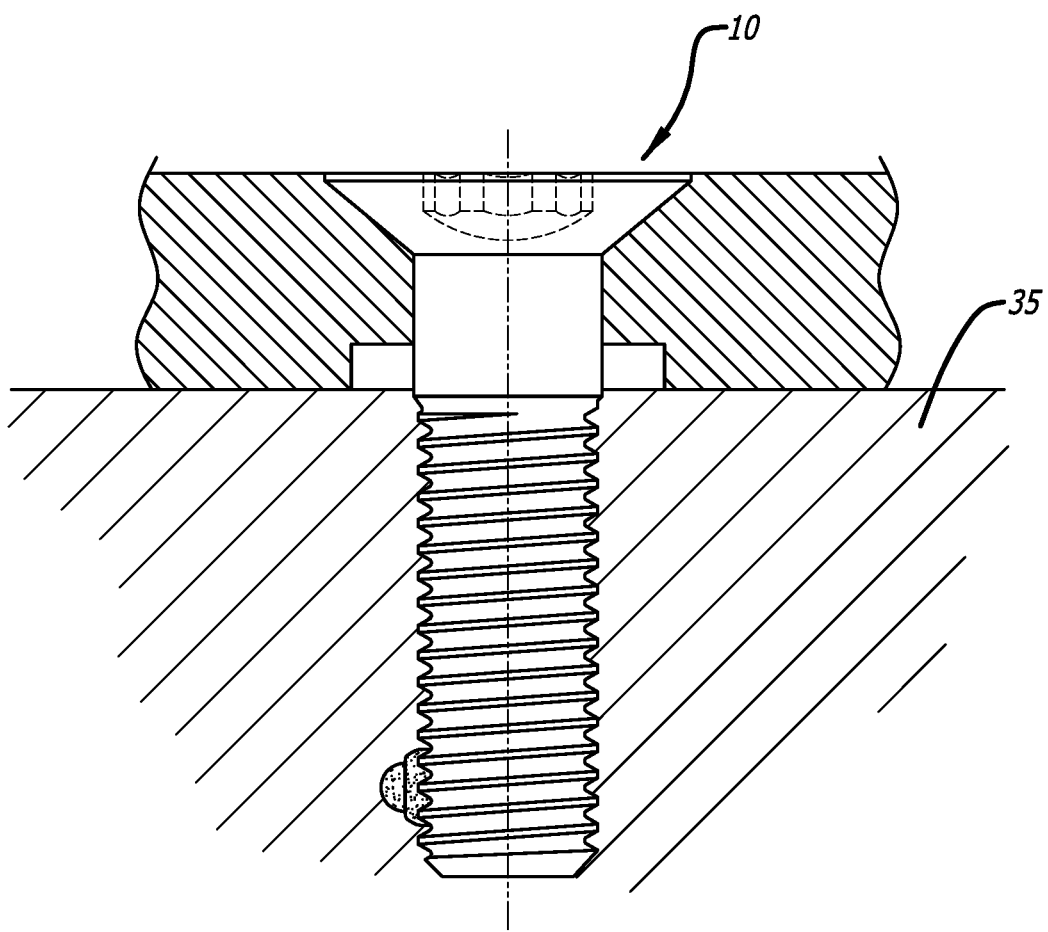
FIG. 8 illustrates the holdout fork removed as the screw is screwed flush with the panel and engaged with the mating nut.

FIG. 8 shows the assembly of the captive screw completely installed and engaged with the mating component 35.

We claim:

1. A captive fastener system comprising a fork, and a fastener having a head, neck, and threaded shank, the captive fastener system comprising:
- a first bore near the distal end of the shank and a counter bore coaxial thereto;
- a plug occluding the counter bore;
- a coil spring disposed within the counter bore having a longitudinal axis that is aligned with axes of the bore and counter bore;
- a pin disposed within the bore and having a pinhead configured to prevent the pin from escaping the first bore, a distal tip of said pin extendable through the first bore against a biasing of the spring and wherein a length of the pin allows the pin to be fully retractable into the first bore;
- a holdout fork having a base and a pair of spaced apart tines separated by a distance equal to an outer diameter the threaded shank, the base including an angled tab that extends obliquely with the spaced apart tines;
- wherein an inwardly directed force on the pin compresses the spring and allows the pin to recede into the bore; and
- wherein the hold-out fork is placed on the shank such that the tines engage the shank therebetween to hold the shank while the pin is retracted in a body to be fastened.

2. The captive fastener system of claim 1, wherein the hold-out fork angled tab extends obliquely with the spaced apart tines at an angle between one hundred thirty degrees and one hundred forty degrees.

* * * * *